United States Patent
Lin

(10) Patent No.: US 8,434,382 B2
(45) Date of Patent: May 7, 2013

(54) SPEED ADJUSTING DEVICE OF A SPEED CHANGER

(76) Inventor: Chang Hui Lin, Changhu (TW)

( * ) Notice: Subject to any disclaimer, the term of this patent is extended or adjusted under 35 U.S.C. 154(b) by 244 days.

(21) Appl. No.: 13/094,748

(22) Filed: Apr. 26, 2011

(65) Prior Publication Data

US 2012/0272771 A1 Nov. 1, 2012

(51) Int. Cl.
*B62K 25/02* (2006.01)

(52) U.S. Cl.
USPC .... 74/473.14; 74/500.5; 74/473.1; 74/473.13

(58) Field of Classification Search .......... 74/500.5, 74/501.6, 469, 471 R, 473.1, 473.13, 473.14
See application file for complete search history.

(56) References Cited

U.S. PATENT DOCUMENTS

| | | | | |
|---|---|---|---|---|
| 3,934,481 A | * | 1/1976 | Foster | 476/2 |
| 5,004,083 A | * | 4/1991 | Lohman | 192/217.1 |
| 5,928,103 A | * | 7/1999 | Shoge | 475/297 |
| 6,013,005 A | * | 1/2000 | Tabe | 475/259 |
| 6,083,136 A | * | 7/2000 | Shoge | 475/297 |
| 6,134,980 A | * | 10/2000 | Uchiyama | 74/473.14 |
| 6,325,386 B1 | * | 12/2001 | Shoge | 277/500 |
| 7,624,656 B2 | * | 12/2009 | Parks et al. | 74/63 |
| 7,708,666 B2 | * | 5/2010 | Hino | 475/297 |
| 8,376,897 B2 | * | 2/2013 | Shoge et al. | 475/284 |

* cited by examiner

*Primary Examiner* — David M Fenstermacher

(57) ABSTRACT

A speed adjusting device of a speed changer being used in a middle speed changer and a rear speed changer of a bicycle, and contains: a base including a first hole fixed on a central portion thereof to insert a first central spindle, and a holder and a fitting member both of which extend from a front end of the base to connect with an adjusting loop, and the fitting member including a ring member fitted thereon; an adjusting loop including a plurality of first screw bores to lock a front cover and a second hole disposed on a central position thereof to receive the first ratchet, the first actuating lever, the ring member, and the hook, the second hole including a groove fixed at a suitable position of an outer side thereof; a front cover including a first orifice formed on a central portion thereof to insert a first screw.

9 Claims, 6 Drawing Sheets

US 8,434,382 B2

SPEED ADJUSTING DEVICE OF A SPEED CHANGER

BACKGROUND OF THE INVENTION

1. Field of the Invention

The present invention relates to a speed adjusting device, and more particularly to a speed adjusting device of a speed changer being used in a middle speed changer and a rear speed changer of a bicycle.

2. Description of the Prior Art

A conventional speed adjusting device of a speed changer of a bicycle is used to shift gears by using a cable connected with a speed changing mechanism and an actuating lever, wherein the actuating lever is actuated to drive the speed changing mechanism, thus shifting upward and downward. However, such a speed changing method will make the speed changing mechanism being actuated by the actuating lever so that the sprocket is shifted upward in one section merely without shifting upward in multi-section.

The present invention has arisen to mitigate and/or obviate the afore-described disadvantages.

SUMMARY OF THE INVENTION

The primary object of the present invention is to provide a speed adjusting device of a speed changer which is capable of overcoming the shortcomings of the conventional speed adjusting device of a speed changer.

Further object of the present invention is to provide a speed adjusting device of a speed changer that is capable of eliminating a positioning error as a chainwheel of a sprocket displaces after bicycle's changing speed.

Another object of the present invention is to provide a speed adjusting device of a speed changer that is capable of shifting gears, shifting up, and shifting downward of the bicycle.

To obtain the above objectives, a speed adjusting device of a speed changer provided by the present invention contains:

a base including a first hole fixed on a central portion thereof to insert a first central spindle, and including a holder and a fitting member both of which extend from a front end of the base to connect with an adjusting loop, and the fitting member includes a ring member fitted thereon;

an adjusting loop including a plurality of first screw bores to lock a front cover and a second hole disposed on a central position thereof to receive the first ratchet, the first actuating lever, the ring member, and the hook, the second hole including a groove fixed at a suitable position of an outer side thereof;

a front cover including a first orifice formed on a central portion thereof to insert a first screw so that the returning spring is hooked with the first screw and is fixed in the rear speed changer such that the front cover, the adjusting loop, the holder are pressed on the rear speed changer.

DETAILED DESCRIPTION OF THE PREFERRED EMBODIMENTS

Figure 1:
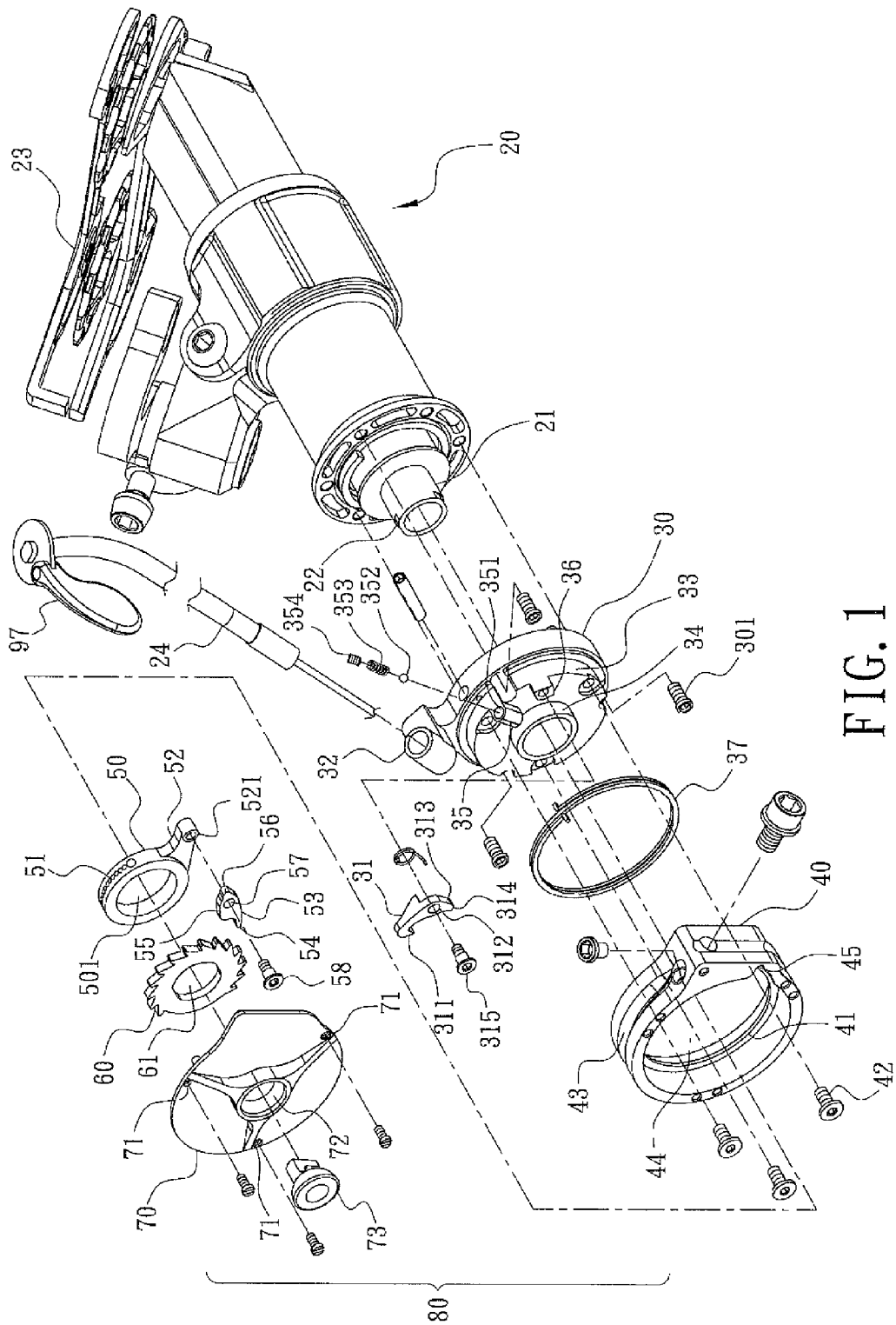
FIG. 1 is a perspective view showing the exploded components of a speed adjusting device of a speed changer according to a preferred embodiment of the present invention.
Figure 2:
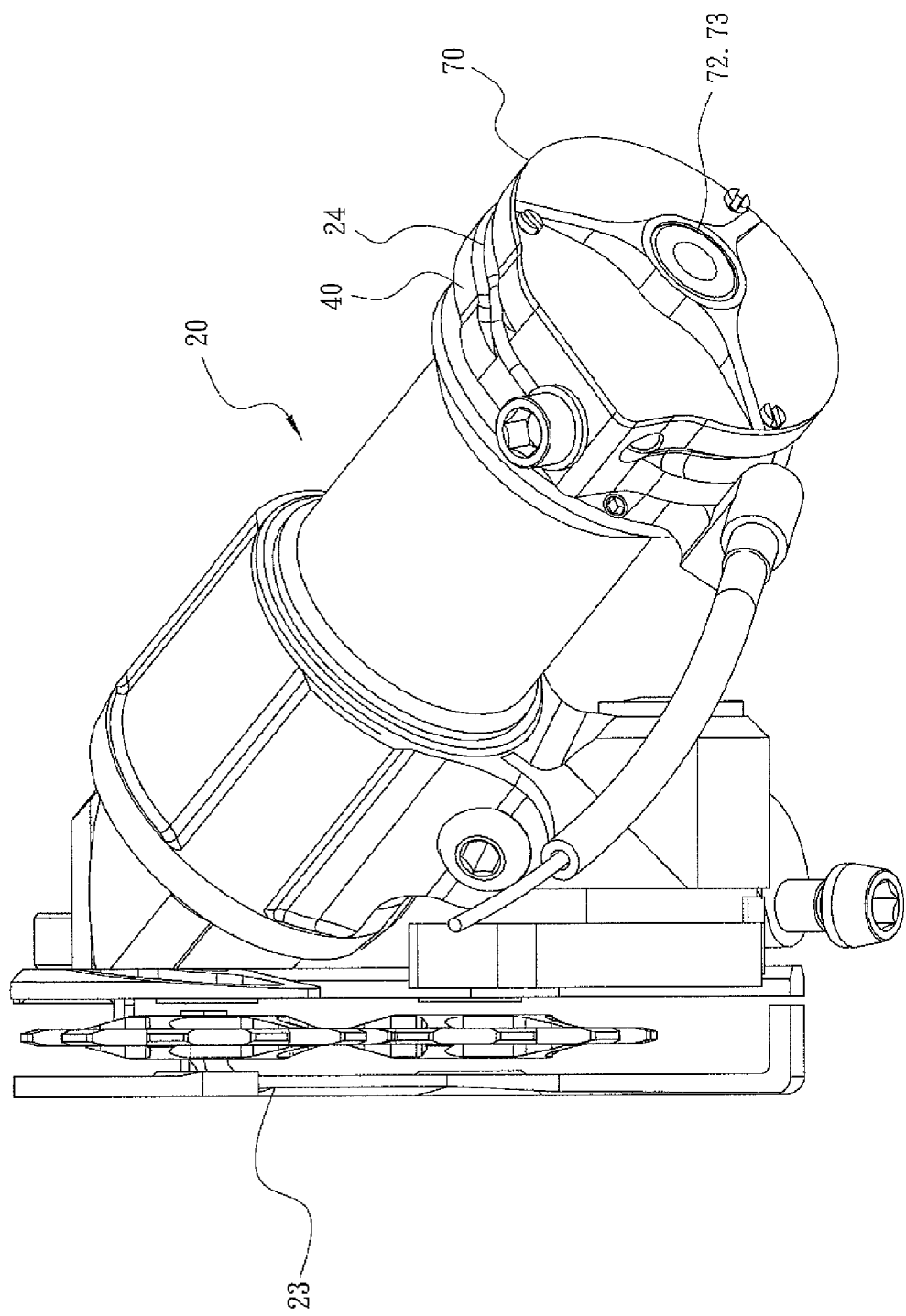
FIG. 2 is a perspective view showing the assembly of the speed adjusting device of the speed changer according to the preferred embodiment of the present invention.
Figure 3:
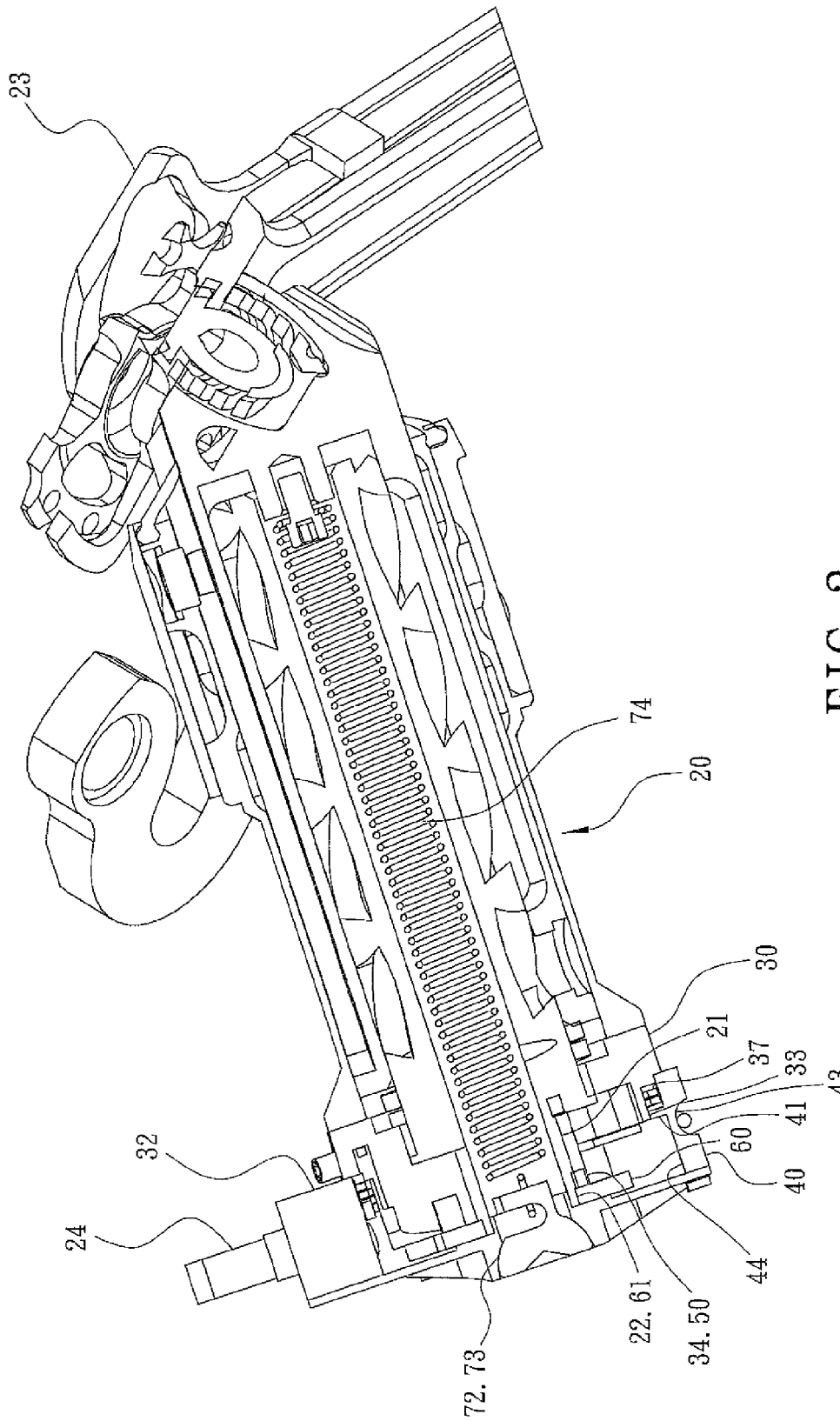
FIG. 3 is a cross sectional view showing the assembly of the speed adjusting device of the speed changer according to the preferred embodiment of the present invention.

The present invention will be clearer from the following description when viewed together with the accompanying drawings, which show, for purpose of illustrations only, the preferred embodiment in accordance with the present invention.

Referring to FIGS. 1-6, a speed adjusting device of a speed changer in accordance with a preferred embodiment of the present invention is used in a middle speed changer 91 and a rear speed changer 20 of a bicycle, wherein a ratchet assembly 80, the middle speed changer 91, and the rear changer 20 are connected together, when the ratchet assembly 80 and the rear speed changer 20 is coupled, a base 30 is fitted and fixed on a first central spindle 21 of the rear speed changer 20 by using a bolt 301, and the first central spindle 21 includes a first oval shaft 22 disposed on a distal end thereof to retain with a first ratchet 60, wherein the first ratchet 60 is provide to roll so that the shaft 22 is rolled in a clockwise direction simultaneously, such that a link wheel 23 of the rear speed changer 20 is pushed outward so as to displace a chain which is engaged with the chain wheel 23 displaces on a chainwheel of a sprocket, thus shifting gears, shifting up, and shifting downward. The ratchet assembly 80 includes a front cover 70, the first ratchet 60, a ring member 50, a hook 31, an adjusting loop 40, a returning spring 37, and the base 30, wherein the base 30 includes a first hole 302 fixed on a central portion thereof to insert the first central spindle 21 and a holder 33 extending from a front end thereof to connect with the adjusting loop 40, and the adjusting loop 40 includes a plurality of first screw bores to lock the front cover 70, and the front cover 70 includes a first orifice 72 formed on a central portion thereof to insert a first screw 73 so that the returning spring 74 is hooked with the first screw 73 and is fixed in the rear speed changer 20, such that the front cover 70, the adjusting loop 40, the holder 33 are pressed on the rear speed changer 20.

Figure 4:
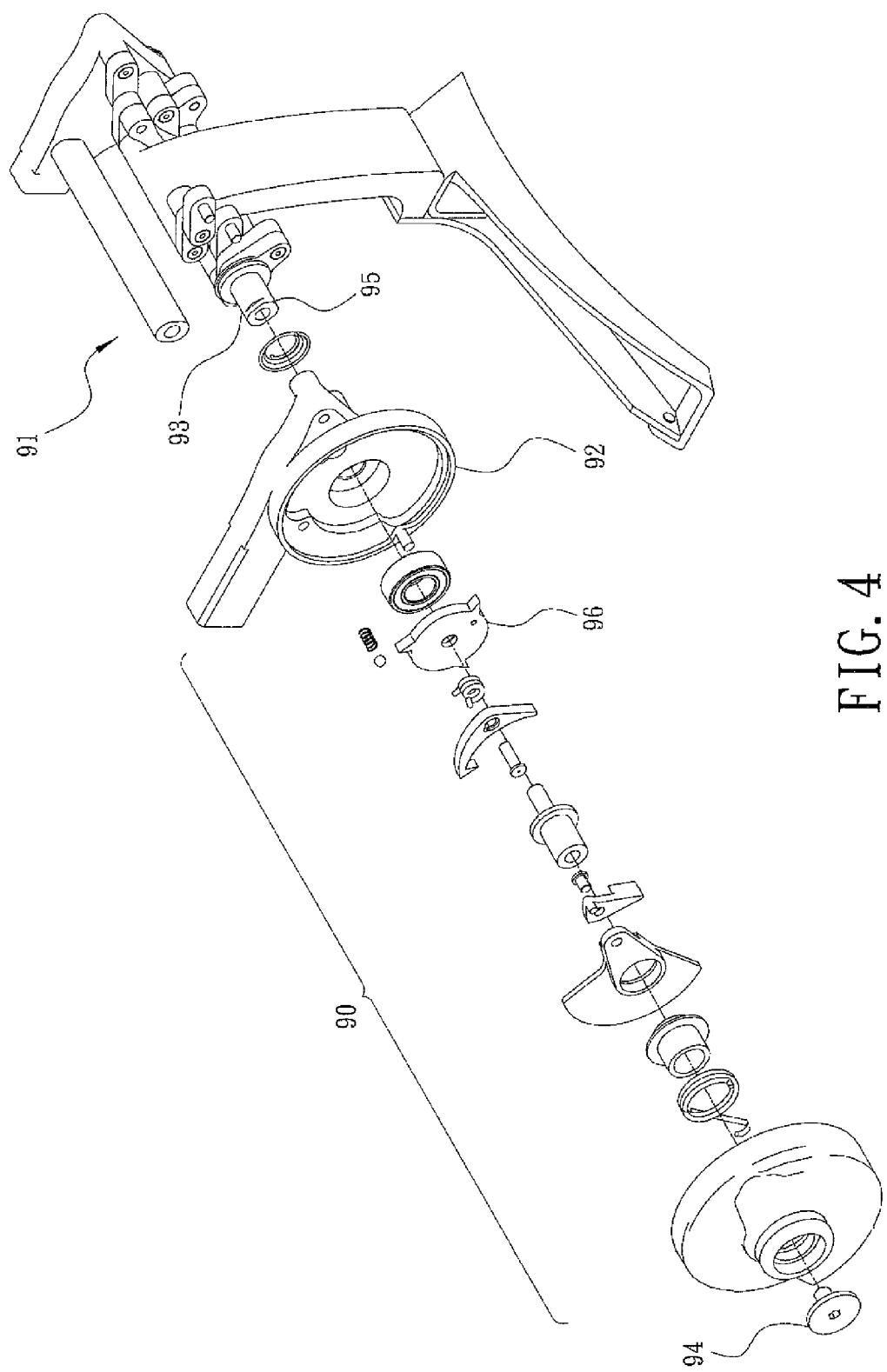
FIG. 4 is a perspective view showing the operation of the speed adjusting device of the speed changer according to the preferred embodiment of the present invention.

The returning spring 37 is defined between the base 30 and the adjusting loop 40 to drive the adjusting loop 40 to rotate back to an original position. The base 30 includes a cable seat 32 disposed on an outer side thereof and the holder 33 and a fitting member 34, both of which extend outward from a front end of the base 30, the holder 33 includes a column 35 fixed on an outer side thereof, and the column 35 includes an aperture 351 to receive a ball 352 and a spring 353, and a second screw 354 is locked in the aperture 351 to fix the ball 352 and the spring 353 such that the ring member 50 is adjusted to return back to an initial speed by using a first opening 51. The base 30 also includes the adjusting loop 40 fitted thereon, and the fitting member 34 includes a ring member 50 fitted thereon, the adjusting loop 40 includes a shoulder 41 secured thereon, and a third screw 42 is locked in a second opening 331 of the holder 33 to be retained with the shoulder 41 of the adjusting loop 40, such that the adjusting loop 40 is retained on the holder 33 so as to prevent from disengagement from the holder 33. The adjusting loop 40 includes a slot 43 arranged on an outer side thereof to insert a cable 24 which is fixed by a fourth screw 92, and the adjusting loop 40 includes a second hole 44 disposed on a central position thereof, and the second hole 44 includes a groove 45 fixed at a suitable position of an outer side thereof and an inner space to receive the first ratchet 60, the first actuating lever 53, the ring member 50, and the hook 31. The first ratchet 60 includes an oval port 61 fixed on a central portion thereof to insert the shaft 22 of the rear speed changer 20, the first actuating lever 53 includes a head portion 54 disposed on a front end thereof, a pushing portion 55 secured on a middle section thereof, and a tail portion 56 attached on a rear end thereof to be retained in the groove 45, and the first actuating lever 53 includes a third hole 57 arranged on a middle section thereof to inert through the fifth screw 58 so that the first actuating lever 53 is locked on an axial mount 521 of a swing peg 52, and the ring member 50 includes a fourth hole 501 disposed on a central portion thereof, a fifth hole 51 fixed on an outer-diameter portion thereof, and the swing peg 52 and the axial mount 521 secured on a peripheral side thereof, the fourth hole 501 is fitted on the fitting member 34 of the base 30 so that the ring member 50 rotates leftward and rightward on the fitting member 34, the hook 31 includes a hooking portion 311 formed on a front end thereof, a second orifice 312 arranged on a rear side of a middle thereof, a distal tail 313 and a stopping portion 314, both of which are disposed on a rear end of the hook 31, wherein the hooking portion 311 of the hook 31 is retained on the first ratchet 60, and a sixth screw 315 is inserted through the second orifice 312 to retain the hook 31 on a projection 36 of the holder 33. The front cover 70 includes a number of second screw bores 71 disposed on a peripheral side thereof and the first orifice 72 formed on the central portion thereof, and the front cover 70 is locked on a front side of the adjusting loop 40 to cover the second hole 44, and the first screw 73 is inserted through the first orifice 72 to hook the returning spring 74 in the rear speed changer 20 so that the front cover 70, the adjusting loop 40, the base 30 are biased against the speed changer 20 to eliminate a tolerance in assembly, such that the adjusting loop 40 is rolled to return back to an initial position by ways of the retuning spring 74, thus connecting all related components of the speed adjusting device together. As shown in FIG. 4, in operation, an second actuating lever 97 is moved more than a fixed angle, the cable 24 pulls the adjusting loop 40 so that the adjusting loop 40 moves toward a first largest angle to retain with the tail portion 56 of the groove 45, such that the tail portion 56 rotates along the fifth screw 58, and then the pushing portion 55 of the first actuating lever 53 pushes the distal tail 313 of the hook 31 so that the hooking portion 311 of the hook 31 disengages from the first ratchet 60, and the first central spindle 21 is rolled, thereafter the stopping portion 314 of the hook 31 stops the first ratchet 60, and the head portion 54 is inserted between the first ratchet 60 so that the first central spindle 21 can not rotate back to an original point in an anti-clockwise direction, then the second actuating lever 97 is moved toward a second largest angle to roll the adjusting loop 40 so that the first actuating lever 53 actuates the first ratchet 60 to rolls in a clockwise direction, and the first central spindle 21 rolls to actuate the rear speed changer 20 so as to change speed, such that the adjusting loop 40 is rolled at a second largest angle, hence the rear speed changer 20 will change its speed in a multi-level section.

Figure 5:
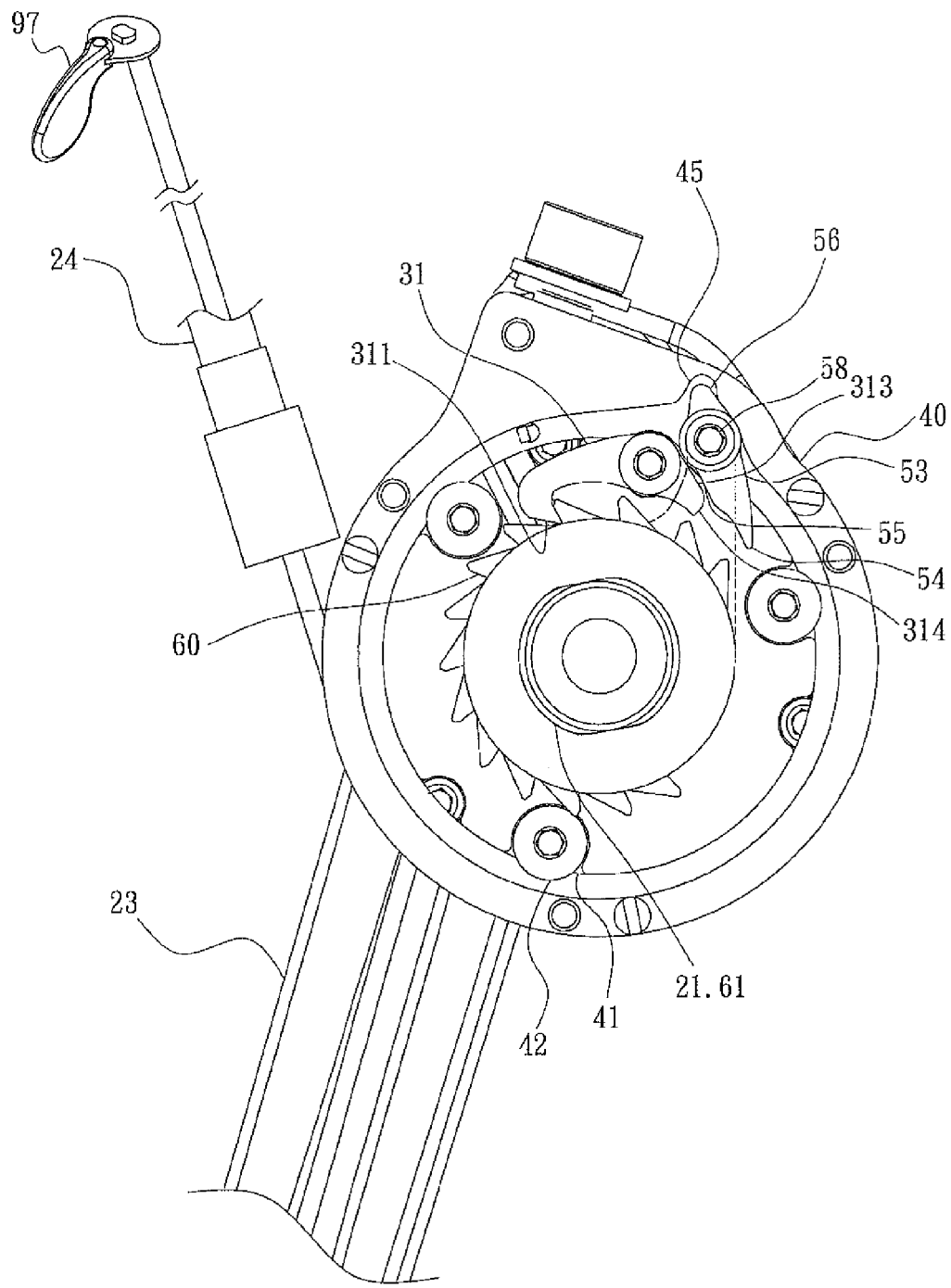
FIG. 5 is another perspective view showing the operation of the speed adjusting device of the speed changer according to the preferred embodiment of the present invention.

Referring to FIG. 5, when the second actuating lever 97 is moved less than a fixed angle, the cable 24 pulls the adjusting loop 40, and the tail portion 56 is actuated so that the first actuating lever 53 rotates along the fifth screw 58, and the pushing portion 55 of the first actuating lever 53 pushes the distal tail 313 of the hook 31 so that the hooking portion 311 of the hook 31 disengage from the first ratchet 60 to release the positioning of the first ratchet 60, thereafter the first ratchet 60 rotates back to a tooth in the anti-clockwise direction to be stopped by the stopping portion 314 of the hook 31 and the head portion 54, and the hooking portion 311 of the hook 31 hooks the first ratchet 60 so that the hook 31 is positioned, thereby rotating the second actuating lever 97 to be less than a fixed angle to moving back in one section.

Figure 6:
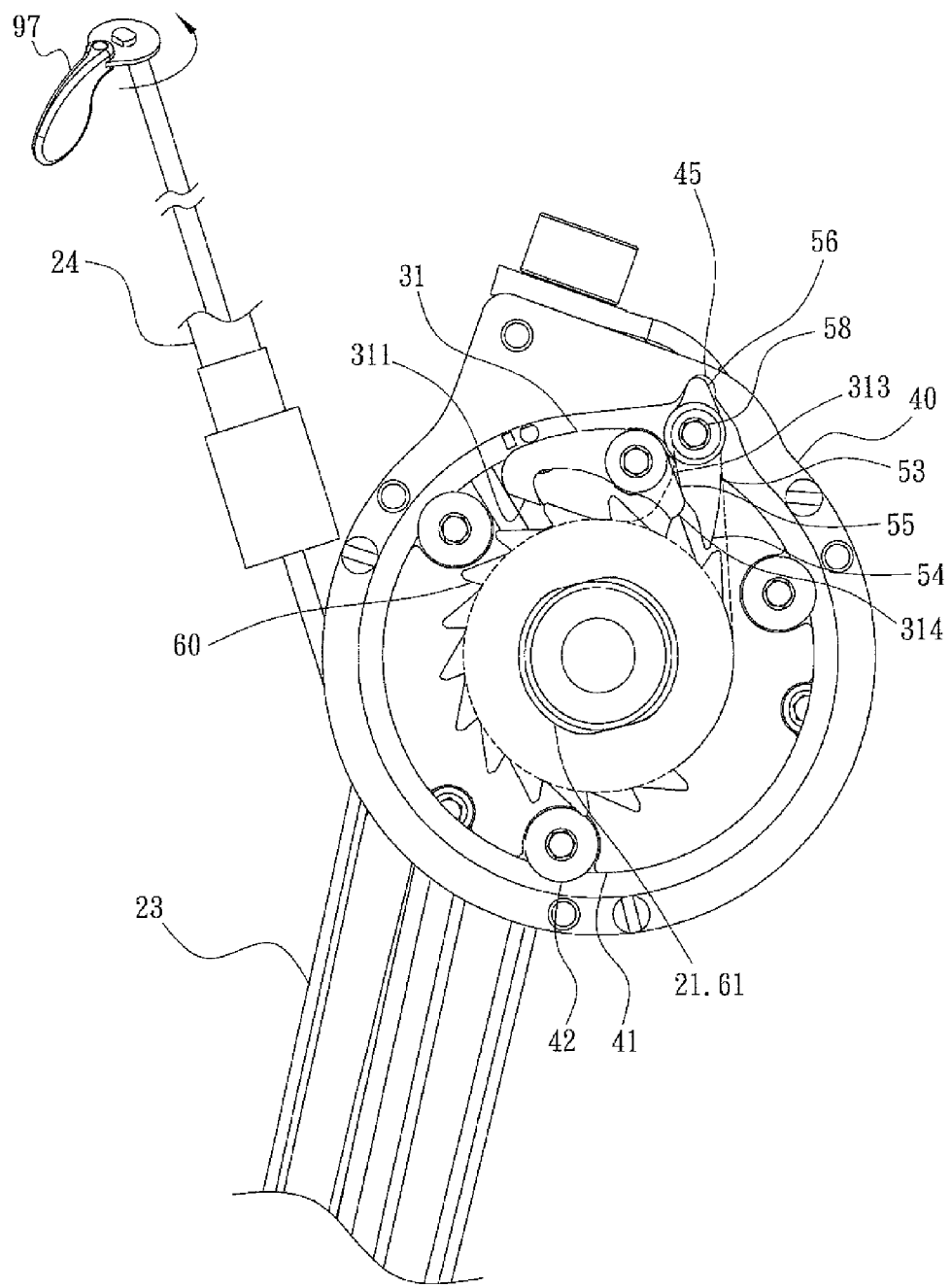
FIG. 6 is also another perspective view showing the operation of the speed adjusting device of the speed changer according to the preferred embodiment of the present invention.

As illustrated in FIG. 6, when a speed-changing ratchet assembly 90 is connected with the middle speed changer 91, a bottom lip 92 is fitted onto a second central spindle 93 by using a seventh screw 94, and the second central spindle 93 of the middle speed changer 91 includes a second oval shaft 95 fixed on a distal end thereof to be retained with a second ratchet 96 so that the second ratchet 96 is rolled to roll the second oval shaft 95 simultaneously, increasing speed or decreasing speed.

While we have shown and described various embodiments in accordance with the present invention, it is clear to those skilled in the art that further embodiments may be made without departing from the scope of the present invention.

What is claimed is:

1. A speed adjusting device of a speed changer being used in a middle speed changer and a rear speed changer of a bicycle, and a ratchet assembly, the middle speed changer, and the rear changer being connected together and comprising:
   a base including a first hole fixed on a central portion thereof to insert a first central spindle, and including a holder and a fitting member both of which extend from a front end of the base to connect with an adjusting loop, and the fitting member includes a ring member fitted thereon;
   an adjusting loop including a plurality of first screw bores to lock a front cover and a second hole disposed on a central position thereof to receive the first ratchet, the first actuating lever, the ring member, and the hook, the second hole including a groove fixed at a suitable position of an outer side thereof;
   a front cover including a first orifice formed on a central portion thereof to insert a first screw so that the returning spring is hooked with the first screw and is fixed in the rear speed changer such that the front cover, the adjusting loop, the holder are pressed on the rear speed changer.

2. The speed adjusting device of the speed changer as claimed in claim 1, wherein the base includes a cable seat disposed on an outer side thereof, and including the holder and the fitting member, both of which extend outward from a front end of the base, the holder includes a column fixed on an outer side thereof, and the column includes an aperture to receive a ball and a spring.

3. The speed adjusting device of the speed changer as claimed in claim 1, wherein the returning spring is defined between the base and the adjusting loop to drive the adjusting loop to rotate back to an original position.

4. The speed adjusting device of the speed changer as claimed in claim 1, wherein the ring member includes a fourth hole disposed on a central portion thereof, a fifth hole fixed on an outer-diameter portion thereof, and the swing peg and the axial mount secured on a peripheral side thereof.

5. The speed adjusting device of the speed changer as claimed in claim 1, wherein the adjusting loop includes a slot arranged on an outer side thereof and a second hole disposed on a central position thereof, and the second hole includes a groove fixed at a suitable position of an outer side thereof and an inner space to receive the first ratchet, the first actuating lever, the ring member, and the hook.

6. The speed adjusting device of the speed changer as claimed in claim 1, wherein the first ratchet includes an oval port fixed on a central portion thereof to insert an oval shaft of the rear speed changer.

7. The speed adjusting device of the speed changer as claimed in claim 1, wherein the ring member includes a fourth hole disposed on a central portion thereof, a fifth hole fixed on an outer-diameter portion thereof, and a swing peg and an axial mount secured on a peripheral side thereof.

8. The speed adjusting device of the speed changer as claimed in claim 1, wherein the hook includes a hooking portion formed on a front end thereof, a second orifice arranged on a rear side of a middle thereof, a distal tail and a stopping portion, both of which are disposed on a rear end of the hook.

9. The speed adjusting device of the speed changer as claimed in claim 4, wherein the first actuating lever includes a head portion disposed on a front end thereof, a pushing portion secured on a middle section thereof, and a tail portion attached on a rear end thereof to be retained in the groove.

\* \* \* \* \*